July. 13, 1926.
C. S. BLOWERS
1,592,716
ADJUSTABLE COMBINATION SOLDER BUSHING, FLOOR FLANGE, AND WASTE PIPE SUPPORT
Filed March 19, 1925
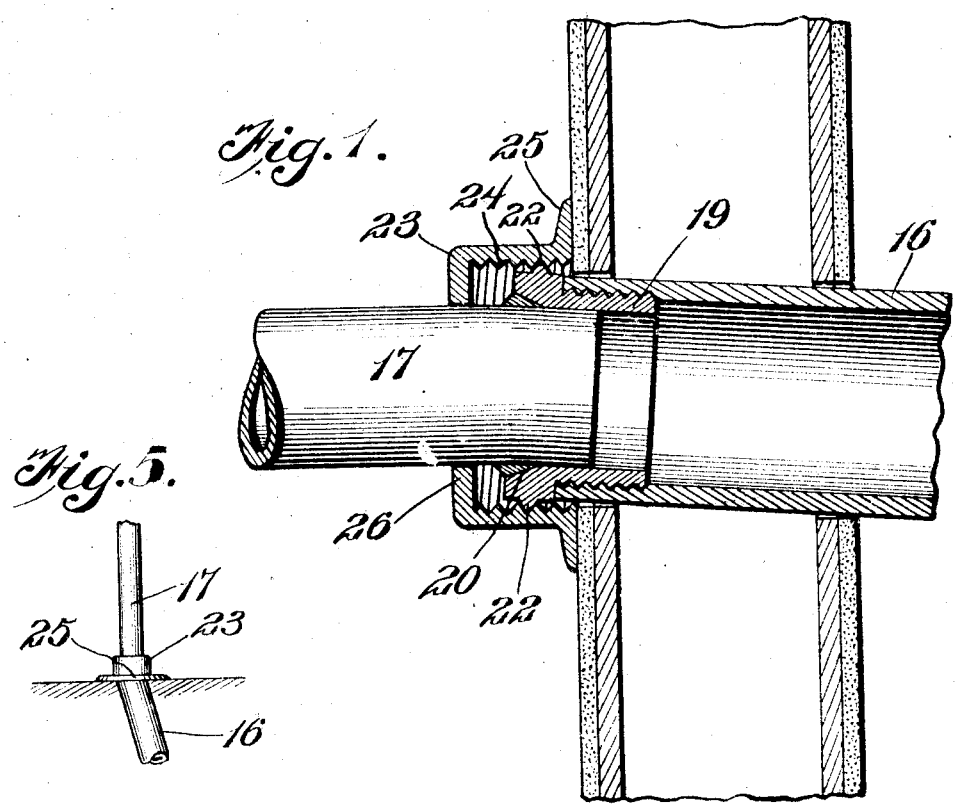
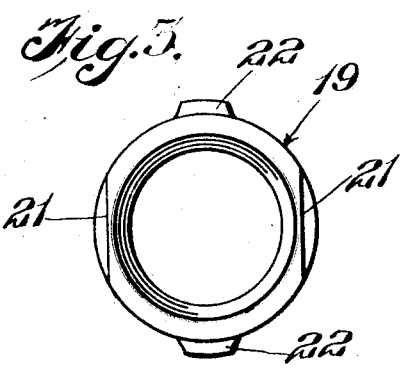
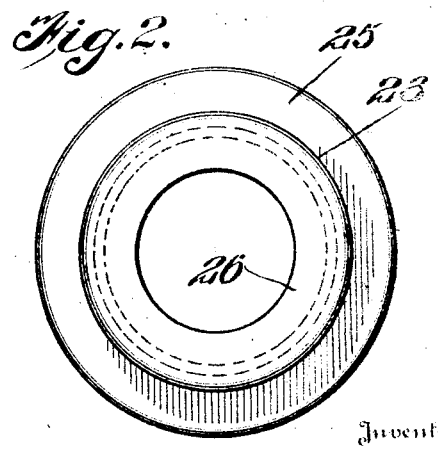
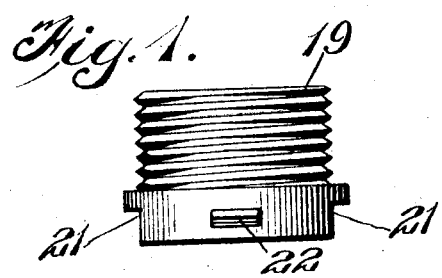
Inventor
Carl S. Blowers
By Watson E. Coleman
Attorney Patented July 13, 1926.

1,592,716

UNITED STATES PATENT OFFICE.

CARL S. BLOWERS, OF AKRON, OHIO.

ADJUSTABLE COMBINATION SOLDER BUSHING, FLOOR FLANGE, AND WASTE-PIPE SUPPORT.

Application filed March 19, 1925. Serial No. 16,840.

This invention relates to plumbers' fixtures, and particularly to a combination solder bushing, floor flange and waste pipe support.

One of the objects of this invention is to provide a combined solder bushing and a waste pipe support.

A further object is to provide a device of this character which is adapted to rest upon a floor surface or against a wall surface and form a flange.

Another and very important object is to provide a bushing of this character which will permit one of the sections of the waste pipe to be disposed at an obtuse angle to the other section so that a pipe coming through the wall or floor may be disposed at an inclination to the axis of the bushing itself and still the flange or bushing will lie flat and tight against the floor or wall.

Still another object is to provide a device of this character which is so constructed that this inclination may be in any desired direction and have a relatively wide range of application.

A further object is to provide a construction which is readily applied, simple, neat, and thoroughly effective in practice.

Other objects will appear in the course of the following description.

My invention is illustrated in the accompanying drawings, wherein:—

Figure 1 is a sectional view through a wall showing an embodiment of my solder bushing, floor flange and waste pipe support, the bushing and flange being in section;

Figure 2 is a face view of the flange;

Figure 3 is an end view of the bushing;

Figure 4 is a side elevation of the bushing;

Figure 5 is a view showing the application of the waste pipe support shown in Figure 1 to a vertical pipe.

In Figures 1 to 5, I have illustrated a form of solder bushing, floor flange and waste pipe support which is particularly advantageous, in that it permits the section 16 of the waste pipe and the section 17 to be disposed with their axes at an angle to each other but with the flange of the bushing lying flat against the wall or floor. In these figures it will be seen that my improved solder bushing, floor flange and waste pipe support is formed in two parts or sections, the flange proper and the bushing proper. In these figures, 19 designates the bushing proper, which is preferably made of brass, though it might be made of any other suitable material, this bushing having a uniform diameter from its rear end toward its front end, and then being outwardly flared or beveled, as at 20. The opposite faces of the beveled end of the bushing are cut away to form shoulders 21 so that a wrench may be applied thereto, and in quartering relation to these shoulders this head of the bushing is formed with outwardly projecting lugs 22 which are sharp-edged or wedge-shaped. The interior of the bushing may be screw-threaded but is shown as smooth. The flange or cap, as illustrated in Figure 2, consists of an annular casting 23 having interior screw-threads 24 and a flange 25. At the end of this cap remote from the flange 25 the cap is inwardly extended or flanged, as at 26, defining a central opening.

The bushing 19 is adapted to be engaged with the interior screw-threads 24 by means of the lugs 22 which will engage in the screw-threads and which will follow these screw-threads as the cap or "flange" 23 is turned with relation to the bushing itself. The pipe 16 may be engaged either with the exterior or interior of the bushing 19 and the pipe 17 is inserted through the central opening of the cap and is extended into the bushing and soldered, as shown in Figure 1. The two pipes 16 and 17 may meet or not as desired.

It is obvious that the two pipes 16 and 17 may meet or abut against each other or that a space may be left between the two pipes. Preferably solder is applied to the pipe 17 around the beveled end of the sleeve or bushing 19. As shown in Figure 1, the cap 23 may be disposed either with its axis in line with the axis of the pipe 16 or at an inclination to the axis of the pipe 16 and yet the flange 25 of this member 23 will bear flat against the wall or floor.

In Figure 5, I illustrate the application of the construction shown in Figure 1 to a sink or like construction where the pipe 17 is vertical. It is to be understood that the pipe 16 and the bushing 19 are adjustable to an angle in any direction, that is, up or down or to either side, and while I have illustrated in Figure 1 the pipe 16 and the bushing 19 as having a slight angle, a greater angle might be given to these parts if desired. 25 in Figure 5 is of such diameter or projects out far enough from the body on which the flange is mounted as to secure a relatively large bearing on the floor or against the wall and that when the flange is projected out in this manner it constitutes a very strong support against the strain exerted by the downward pull of the pipe 16 in Figure 5 and against the weight of the pipe 17 and the fixture above it. The faces of the flanges 25 and 10 are beveled and polished smooth so that an ornamental cap is provided as well as a supporting flange so the device when in place not only acts as a support for the pipe 16 and the pipe 17 but provides the finish which all plumbers use at this point and which covers up the hole in the floor or wall through which the pipes extend.

I claim:—

1. As an article of manufacture, a combined solder bushing, floor flange and waste pipe support comprising a bushing, and a wall-engaging flange separate from the bushing, the bushing and flange having one a screw-threaded portion and the other having diametrically disposed lugs engaging said screw-threaded portion, whereby the bushing may be disposed with its axis at an inclination to the axis of the flange.

2. As an article of manufacture, a combined solder bushing, floor flange and waste pipe support comprising a bushing, and a wall-engaging flange separate from the bushing, the flange having interior screw-threads and the bushing having diametrically disposed, oppositely projecting lugs formed to engage said screw-threads and engageable with the screw-threads when the flange is disposed with its axis at an angle to the axis of the bushing.

3. As an article of manufacture, a combination solder bushing, floor flange and waste pipe support comprising a bushing, the bushing being formed with two diametrically extending, outwardly projecting lugs disposed in a plane at right angles to the axis of the bushing, and a flange having an interiorly screw-threaded body with which the lugs are adapted to engage, the body at its base being formed with an outwardly projecting wall-engaging flange and the end of the body opposite said flange being inwardly extended and defining a central opening.

In testimony whereof I hereunto affix my signature.

CARL S. BLOWERS.